March 3, 1959   L. MANSFIELD   2,875,531
EDUCATIONAL DEVICE OF INTERLOCKED PUZZLE PIECES
Filed Feb. 28, 1955

INVENTOR
Lee Mansfield
BY
ATTORNEY

United States Patent Office 2,875,531
Patented Mar. 3, 1959

2,875,531
EDUCATIONAL DEVICE OF INTERLOCKED PUZZLE PIECES

Lee Mansfield, Sanford, Fla.

Application February 28, 1955, Serial No. 490,831

4 Claims. (Cl. 35—69)

This invention relates to education and to articles and equipment useful in this field for assisting in the educational process by entertaining and holding the attention of those being educated.

Specifically the invention relates to a puzzle which can only be assembled by a youngster while learning a lesson carried by the puzzle, the assembling of the puzzle being both educational and entertaining. Furthermore, after the puzzle has been assembled it can be displayed on a wall as a picture or used in some other ornamental or decorative manner.

In educating the juvenile mind in the rudiments of mathematics, spelling, reading and other basic subjects, it has been found that the educational aims have been more readily obtained by the use of instruction methods and objects that were not only educational but also entertaining to the pupils, thereby holding their attention while the educational process is carried out. Heretofore, puzzles have been offered to the public which taught a lesson and at the same time entertained one assembling them, but when they were used to educate juveniles of a tender age, it was found that the juveniles assembled the puzzles in the same manner that an ordinary puzzle is assembled, thereby defeating the educational purpose of the puzzle. Furthermore, earlier educational puzzles have not been assembled in a container which forms a picture frame for decorative purposes and keeps the puzzle pieces together during times of storage.

An object of this invention is to overcome the above enumerated disadvantages and to provide a simple inexpensive puzzle useful in educating youngsters by entertaining them and at the same time educating them; the youngster having to learn the lesson taught by the puzzle, it being impossible to assemble the puzzle in the same manner as an ordinary puzzle is assembled.

Another object of the invention is to provide an educational puzzle that forms its own container for shipping or storage purposes and can be displayed in the form of a picture by a child proud of having learned the lesson necessary for assembling the puzzle.

Figure 1:
Figure 3:
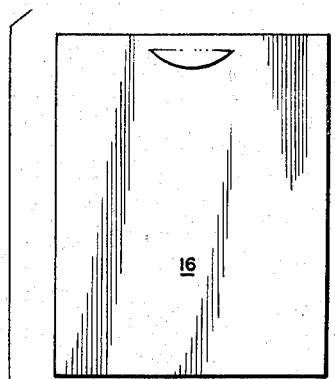
Figure 2:
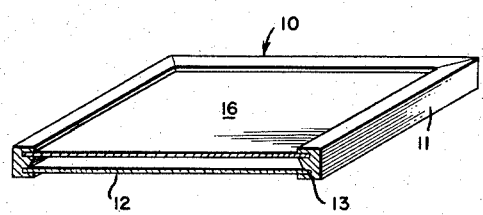
Figure 5:
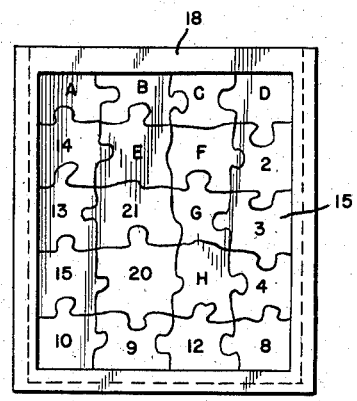
Figure 5:
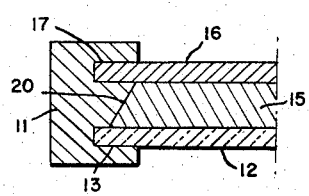
Figure 4:
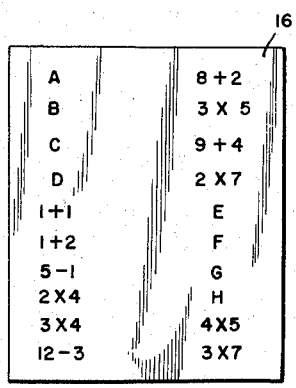

Further objects and advantages of the invention will be apparent from the following description taken in conjunction with the drawings wherein:

Fig. 1 is a front plan view of the puzzle assembled in the containing frame;

Fig. 2, a sectional perspective of the puzzle in the frame with the front of the puzzle facing away;

Fig. 3, an exploded plan view of the back side of the puzzle with the back member removed from the frame;

Fig. 4, a plan view of the puzzle rear cover illustrating the puzzle side that carries the educational material; and, Fig. 5, a sectional view taken through a frame member illustrating the relation between the rear cover and the transparent front window.

Briefly, the educational puzzle of the present invention is a decorative surface formed from a plurality of interlocking pieces contained in a frame having a transparent window for viewing the decorative surface of the puzzle. Each piece of the puzzle carries indicia which corresponds to indicia carried by an enclosing rear cover of the puzzle frame, the relation between the indicia on the puzzle pieces and that carried by the rear cover being in the form of an educational lesson.

As illustrated in the drawings, the frame 10 consists of four frame members 11 enclosing a front transparent window 12 set in slots 13 of the frame members 11. The window 12 can be either glass or any of the known transparent plastic materials that would be suitable. A decorative surface 14 of a size to fit within the enclosing frame members 11 is formed from a plurality of puzzle pieces 15, the decorative surface 14 being limited to only one side of the puzzle pieces 15.

A rear cover 16 is slidably mounted within three of the four frame members 11 in slots 17 illustrated in Fig. 5. The fourth frame member is cut away at its rear portion 18 for accommodating the removal or insertion of rear cover 16 in slots 17. A suitable latch such as a pivoted dog could be provided to hold the rear cover 16 in position within the frame members 11.

The inner edges 20 of all four of the frame members 11 intermediate slots 13 and slots 17 are inclined outwardly and forwardly of the members 11 as shown in Fig. 5. The border edges of the puzzle formed from interlocking puzzle pieces 15 are also inclined outwardly from the rear surface to the front decorative surface 14 of interlocking puzzle pieces 15 also shown in Fig. 5. It can be seen that by so inclining the inner edges of the frame members 11 and the border edges of the puzzle pieces, the puzzle pieces must be assembled within the frame pieces 11 by first starting with the bordering pieces of the puzzle before inserting the inside pieces. Also the puzzle has to be assembled in an upside down position.

Each of the puzzle pieces 15 contain indicia on their backs which correspond to indicia listed on the rear cover 16. The relation between the indicia on the back of the puzzle pieces 15 and the indicia on the inside surface of the rear cover 16 constitutes a lesson which the child must learn in order to accomplish the assembly of the puzzle pieces within the frame 10. The indicia relations illustrated in Figs. 3 and 4 of the drawings are merely examples and the lesson taught by the puzzle can take many and varied forms depending on the educational field taught and the age of the child assembling the puzzle.

The indicia set forth on the front surface of the rear cover 16 is in two rows. Naturally, the first row is on the left hand side of the plate as illustrated in Fig. 4. The first puzzle piece to be set in place would be the piece which corresponds to the top left hand indicia which in the drawing is the letter "A". The puzzle piece having the letter "A" marked on its back would be first assembled in the top left hand portion of the puzzle. Then the child would continue on down the list assembling the puzzle pieces in a clockwise motion continuing around the puzzle until the assembly of the puzzle is completed.

Once the assembly of the puzzle has been completed, the upper left hand puzzle piece marked with the letter "A" could be glued in position if it was considered necessary as an aid to the child in assembling the puzzle. When the puzzle has been completely assembled within the frame 10 the child has learned the lesson taught by the particular puzzle and at the same time finished the puzzle which can then be hung on the wall as a picture and proudly displayed by the child as a symbol of his education or merely as a decoration.

The youngster can also assemble the puzzle outside of the frame 10 using the decorative side of the puzzle pieces 15 for his own amusement, but before placing the puzzle pieces in frame 10 for storage he must either learn or remember the lesson taught by the particular puzzle. The inclined border portion of the puzzle pieces 15 which abut inclined edges 20 of frame members 11 keep the child from first assembling the puzzle outside the frame using the decorative side of the puzzle and then inserting the assembled puzzle inside the frame, thereby defeating the educational purpose of the puzzle.

As a further example of the lesson that might be taught by the puzzle, particularly for older children, the rear cover 16 could display a list of questions, for example, questions pertaining to the Bible and the puzzle pieces 15 could have indicia thereon setting forth corresponding Biblical verses answering the questions. If there were fifty pieces in the puzzle, the rear cover 16 would have fifty questions, each question corresponding to a specific puzzle piece having an answer on its back.

It will be obvious to those skilled in the art that various changes may be made in the invention without departing from the spirit and scope thereof, and, therefore, the invention is not limited to that which is shown in the drawing and described in the specification, but only as indicated in the accompanying claims.

I claim:

1. An educational device comprising a puzzle composed of a plurality of interlocking puzzle pieces which when assembled display an ornamental surface on one face, a frame enclosing the edges of said puzzle, a transparent front window enclosed within said frame and overlying said ornamental surface, a rear cover carried on the back of said frame, said rear cover being slidably mounted in slots in said frame, said frame having inner edges inclined forwardly and outwardly from said frame, the border of said puzzle having corresponding inclined edges so that the border puzzle pieces must first be inserted in said frame in assembling said puzzle within said frame, the rear face of each of said puzzle pieces having indicia which relates to corresponding indicia contained on said rear cover, the relation between the indicia on the puzzle pieces and the indicia on said rear cover being in the form of an educational lesson.

2. An educational device comprising a puzzle composed of a plurality of interlocking puzzle pieces which when assembled display an ornamental surface on one face, a frame enclosing the edges of said puzzle, a transparent front window enclosed within said frame and overlying said ornamental surface, said frame having inner edges inclined forwardly and outwardly, and the border of said puzzle having corresponding inclined edges so that the border puzzle pieces must first be inserted in said frame in assembling said puzzle within said frame.

3. An educational device comprising a puzzle composed of a plurality of interlocking puzzle pieces which when assembled display an ornamental surface on one face, a frame enclosing the edges of said puzzle, a transparent front window enclosed within said frame and overlying said ornamental surface, a rear cover carried on the back of said frame, said rear cover being slidably mounted in slots in said frame, said frame having inner edges inclined forwardly and outwardly from said frame, the border of said puzzle having corresponding inclined edges so that the border puzzle pieces must first be inserted in said frame in assembling said puzzle within said frame, the rear face of each of said puzzle pieces having indicia which relates to corresponding indicia contained on said rear cover, the relation between the indicia on the puzzle pieces and the indicia on said rear cover being in the form of an educational lesson, said interlocking puzzle pieces being arranged so that said puzzle can be assembled in substantially a spiral path starting from a specific corner of its outer border, said indicia contained on the rear cover being arranged in consecutive order to correspond to the consecutive puzzle pieces positioned in said spiral path so that each puzzle piece in said spiral path can be consecutively assembled by consecutively following said rear cover indicia.

4. An educational puzzle device comprising a plurality of puzzle pieces, a frame providing a closed periphery, a transparent window secured to one side of the frame through which the puzzle may be observed, said frame being provided with an inner edge on the inner side of said window at an inclination to said window providing a bevel for engagement with beveled edges of the edge pieces of the puzzle, a cover for the other side of said frame for retaining the puzzle pieces in the frame between said transparent window and said cover, said cover being removable to provide for access to said puzzle pieces, and indicia on said cover and on said puzzle pieces to indicate the correct order of application of the puzzle pieces to said frame, said cover and said window serving to retain the puzzle pieces in assembled relation whereby the puzzle may be used as a picture after assembly.

References Cited in the file of this patent

UNITED STATES PATENTS

| 1,359,115 | Sittinger | Nov. 16, 1920 |
| 1,604,127 | Lambert | Oct. 26, 1926 |
| 2,310,800 | Manhart | Feb. 9, 1943 |
| 2,481,109 | Grace | Sept. 6, 1949 |
| 2,483,833 | Levin | Oct. 4, 1949 |

FOREIGN PATENTS

| 987,493 | France | Apr. 18, 1951 |